United States Patent
Wagh et al.

(10) Patent No.: US 9,952,644 B2
(45) Date of Patent: *Apr. 24, 2018

(54) DEVICE POWER MANAGEMENT STATE TRANSITION LATENCY ADVERTISEMENT FOR FASTER BOOT TIME

(71) Applicant: Intel Corporation, Santa Clara, CA (US)

(72) Inventors: Mahesh Wagh, Portland, OR (US); Lily Pao Looi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/986,580

(22) Filed: Dec. 31, 2015

(65) Prior Publication Data

US 2016/0116959 A1    Apr. 28, 2016

Related U.S. Application Data

(63) Continuation of application No. 13/838,220, filed on Mar. 15, 2013.

(51) Int. Cl.
*G06F 1/00* (2006.01)
*G06F 1/32* (2006.01)
(Continued)

(52) U.S. Cl.
CPC ............ *G06F 1/3203* (2013.01); *G06F 1/325* (2013.01); *G06F 1/3206* (2013.01);
(Continued)

(58) Field of Classification Search
CPC .... G06F 1/3203; G06F 1/3206; G06F 1/3234; G06F 1/325; G06F 1/3275; G06F 1/3287;
(Continued)

(56) References Cited

U.S. PATENT DOCUMENTS

| | | |
|---|---|---|
| 7,657,774 B1 | 2/2010 | Hung et al. |
| 2003/0212531 A1 | 11/2003 | Kerr et al. |

(Continued)

FOREIGN PATENT DOCUMENTS

| | | |
|---|---|---|
| CN | 1653397 A | 8/2005 |
| CN | 102474822 A | 5/2012 |

(Continued)

OTHER PUBLICATIONS

Office Action received for Chinese Patent Application No. 201410093976.8, dated Jun. 3, 2016, 19 pages including 8 pages of English translation.
(Continued)

*Primary Examiner* — Xuxing Chen
(74) *Attorney, Agent, or Firm* — Alpine Technology Law Group LLC

(57) ABSTRACT

Methods and apparatus relating to device power management state transition latency advertisement for faster boot time are described. In some embodiments, a storage unit stores a value corresponding to a requisite transition delay period for a first agent to exit from a low power consumption state. The first agent writes the value to the storage unit and a second agent waits for the requisite transition delay period (after the first agent initiates its exit from the low power consumption state) before the second agent attempts to communicate with the first agent via a link. Other embodiments are also disclosed and claimed.

10 Claims, 5 Drawing Sheets

(51) Int. Cl.
*G06F 9/44* (2018.01)
*G06F 13/42* (2006.01)

(52) U.S. Cl.
CPC .......... *G06F 1/3234* (2013.01); *G06F 1/3275* (2013.01); *G06F 1/3278* (2013.01); *G06F 1/3287* (2013.01); *G06F 9/4418* (2013.01); *G06F 13/4265* (2013.01); *G06F 13/4282* (2013.01); *Y02B 60/1225* (2013.01); *Y02B 60/1228* (2013.01); *Y02B 60/1235* (2013.01); *Y02B 60/1282* (2013.01); *Y02B 60/186* (2013.01)

(58) Field of Classification Search
CPC ............... G06F 9/4418; G06F 13/4282; G06F 13/4265; Y02B 60/1225; Y02B 60/1228; Y02B 60/1235; Y02B 60/1282; Y02B 60/186
See application file for complete search history.

(56) References Cited

U.S. PATENT DOCUMENTS

| | | |
|---|---|---|
| 2005/0262368 A1 | 11/2005 | Cherukuri |
| 2008/0109565 A1 | 5/2008 | Ajanovic et al. |
| 2009/0240839 A1 | 9/2009 | Yoneyama |
| 2012/0083200 A1 | 4/2012 | Koh et al. |
| 2012/0159060 A1* | 6/2012 | Yu .............................. G06F 1/30 711/105 |
| 2012/0159224 A1 | 6/2012 | Bondalapati et al. |

FOREIGN PATENT DOCUMENTS

| | | |
|---|---|---|
| CN | 105740197 | 7/2016 |
| EP | 2778838 A2 | 9/2014 |
| EP | 3032374 A1 | 6/2016 |

OTHER PUBLICATIONS

Notice of Publication received for Chinese Patent Application No. 201610070957.2, dated Jul. 13, 2016, 2 pages including 1 page of English translation.
"Integrated Circut", Internet article, Mar. 18, 2015, 5 pages, retrieved from http://en.wikipedia.org/wiki/Integrated_circut.
Communication received from the European Patent Office received for European Patent Application 14158370.8, dated Oct. 27, 2014.
Extended European Search Report received for European Patent Application No. 14158370.8, dated Sep. 29, 2014, 7 pages.
Extended European Search Report received for European Patent Application No. 16152193.5, dated May 9, 2016, 9 pages.
Communication received from European Patent office for European Patent Application No. 16152193.5, dated Jun. 20, 2016, 2 pages.
Extended European Search Report received for European Patent Application No. 16152171.1, dated May 9, 2016, 9 pages.
Office Action received for Chinese Patent Application No. 201410093976.8 dated Jan. 22, 2017, 20 pages including 8 pages of English translation.
Office Action received for U.S. Appl. No. 13/838,220, dated Jan. 5, 2017, 8 pages.
Notice on Having passed the Preliminary Examination received for Chinese Patent Application No. 201610070957.2, dated Mar. 21, 2016, 2 pages including 1 page of English translation.
Communication received for European Patent Application No. 16152171.1, issued by the European Patent Office dated Jun. 20, 2016, 2 pages.
Office Action received for Chinese Patent Application No. 201410093976.8, dated Jul. 25, 2017, 20 pages including 7 pages of English translation.
Office Action received for Chinese Patent Application No. 201410093976.8, dated Feb. 14, 2018, 12 pages including 5 pages of English translation.

* cited by examiner

DEVICE POWER MANAGEMENT STATE TRANSITION LATENCY ADVERTISEMENT FOR FASTER BOOT TIME

CROSS REFERENCE TO RELATED APPLICATIONS

The present application is a continuation of U.S. patent application Ser. No. 13/838,220 filed on Mar. 15, 2013. Said application Ser. No. 13/838,220 is hereby incorporated herein by reference in its entirety.

FIELD

The present disclosure generally relates to the field of electronics. More particularly, an embodiment of the invention relates to techniques for device power management state transition latency advertisement for faster boot time.

BACKGROUND

One common interface used in computer systems is Peripheral Component Interconnect Express (PCIe). In accordance with the PCIe specification, there is a requirement for system software to allow for a transition recovery time of 10 ms before accessing the device when the device exits a low power consumption state. This 10 ms adds to the resume time from power states and may be too long for some devices, which in turn reduces overall performance or usability.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
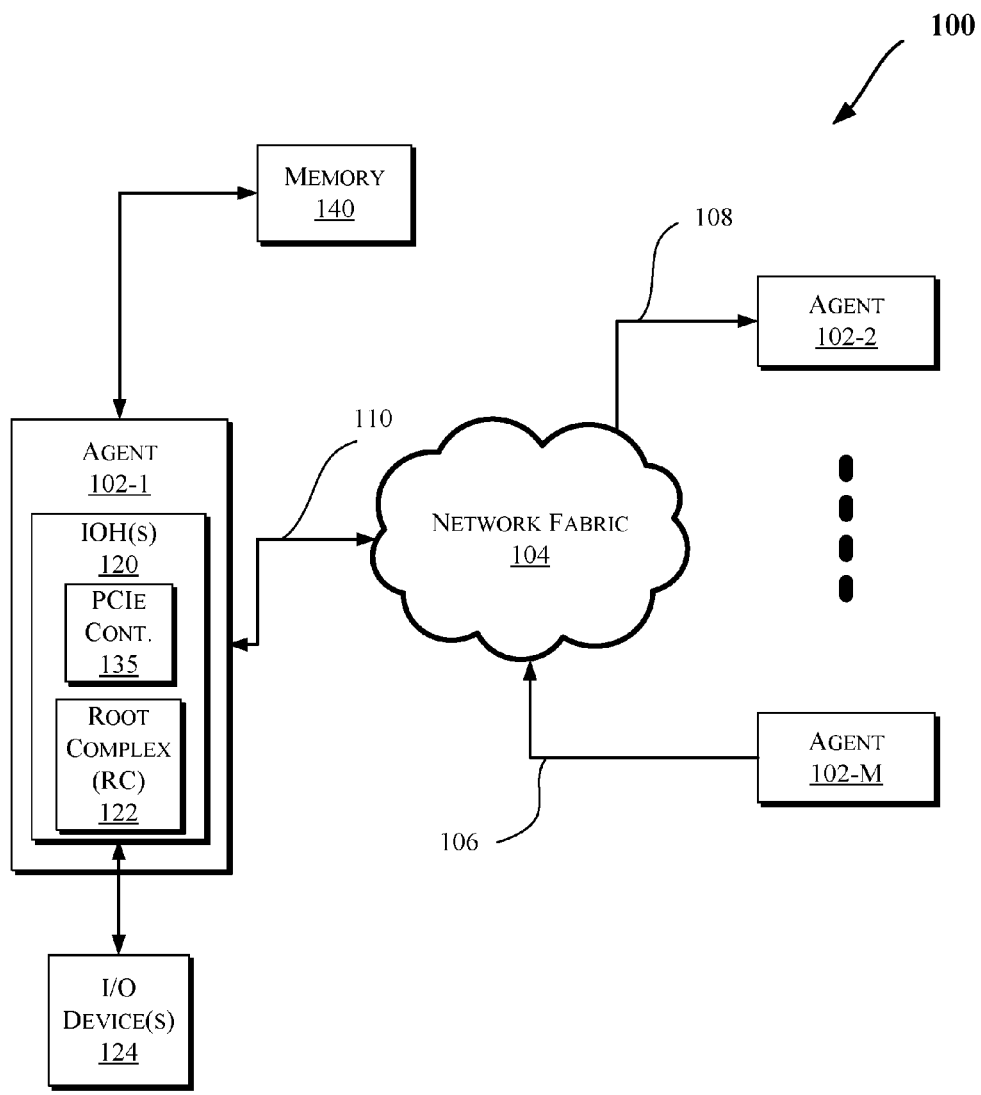
FIG. 1 illustrates a block diagram of an embodiment of a computing systems, which can be utilized to implement various embodiments discussed herein.

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

As discussed above, in accordance with the current PCIe specification (e.g., in accordance with PCI Express Base Specification 3.0, Revision 3.0, version 1.0 Nov. 10, 2010 and Errata for the PCI Express Base Specification Revision 3.0, Oct. 20, 2011) which may be more generally referred to herein as "PCI", there is a requirement for system software to allow for a transition recovery time of 10 ms or 100 ms before accessing the device when the device exits a low power consumption state. This 10 ms/100 ms adds to the resume time from power states may be too long for some devices, which in turn would reduce overall performance or affect user experience/usability. However, there are many devices that can recover faster than this.

To this end, some embodiments provide for device power management state transition latency advertisement for faster boot time. For example, some embodiments provide the ability for the device to advertise the recovery time for D3 to D0 transition (e.g., via a storage unit such as a storage device, a register, a register field, a packet, a packet field, etc.). In turn, software/logic can read the advertised value and access the device as per the advertise value. Accordingly, some embodiments allow for software/logic to resume normal operations based on device advertised values, thus contributing significantly to reducing resume times and a richer user experience. Also, some devices may require more time to exit (e.g., to unforeseen circumstances such as lack of sufficient battery charge in a mobile device, etc.), so an embodiment also allows for increasing the delay/latency time period required by the PCIe specification.

As discussed herein, "D0" refers to a power state indicating normal/full operational state for a (e.g., PCIe) device. Also, "D3" generally refers to a power state such as standby, sleep, and/or suspend. D3 may have one or more variants such as "D3 hot", e.g., indicating standby, sleep, and/or suspend (where the power rail(s) are on but one or more components of the device are in standby, sleep, suspend, etc., for example) and "D3 cold", e.g., indicating standby, sleep, and/or suspend (where the power rails are off too, for example). Moreover, in accordance with the current PCIe specification, the delay for transition from D3 cold to D0 is at 100 ms and the delay for transition from D3 hot to D0 is at 10 ms (which is the D3 case discussed previously).

Various embodiments are discussed herein with reference to a computing system component, such as the components discussed herein, e.g., with reference to FIGS. 1-2 and 4-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2 and 4-5.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may include one or more Input/Output Hubs (IOHs) 120 to facilitate communication between an agent (e.g., agent 102-1 shown) and one or more Input/Output ("I/O" or "IO") devices 124 (such as PCIe I/O devices). The IOH 120 may include a Root Complex (RC) 122 (that includes one or more root ports) to couple and/or facilitate communication between components of the agent 102-1 (such as a processor, memory subsystem, etc.) and the I/O devices 124 in accordance with PCIe specification. In some embodiments, one or more components of a multi-agent system (such as processor core, chipset, input/output hub, memory controller, etc.) may include the RC 122 and/or IOHs 120, as will be further discussed with reference to the remaining figures.

Additionally, the agent 102 may include a PCIe controller logic 135 to manage various operations of a PCIe interface including for example power management features/aspects of PCIe components in the agent 102. Further, as illustrated in FIG. 1, the agent 102-1 and/or I/O device(s) may have access to a memory 140 (which may store delay values of D3 hot/cold transition to D0 for one or more of the I/O devices 124).

Figure 2:
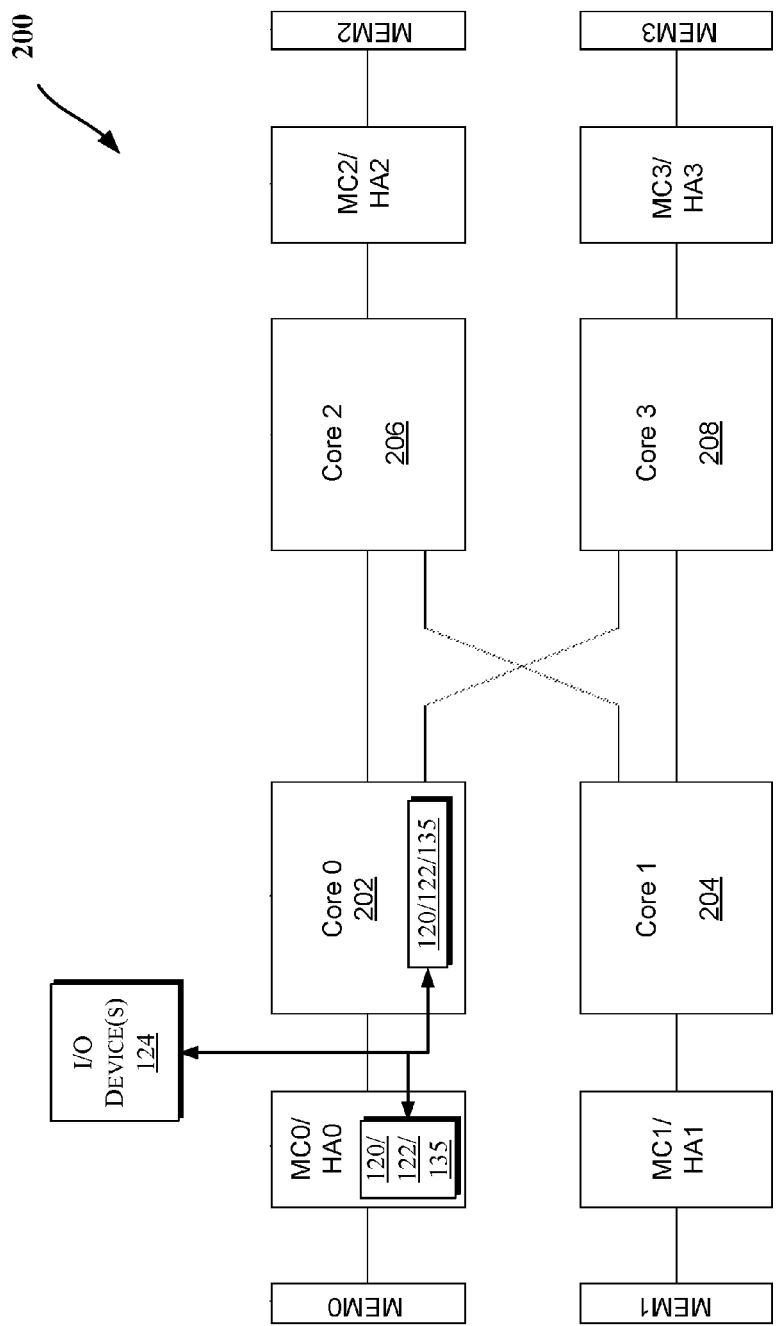
FIG. 2 illustrates a block diagram of an embodiment of a computing system, which can be utilized to implement one or more embodiments discussed herein.

FIG. 2 is a block diagram of a computing system 200 in accordance with an embodiment. System 200 includes a plurality of sockets 202-208 (four shown but some embodiments can have more or less socket). Each socket includes a processor and one or more of items 120, 122, and 135 of FIG. 1 to communicate with one or more of the I/O devices 124. In some embodiments, one or more of items 120, 122, and 135 can be present in one or more components of system 200 (such as those shown in FIG. 2). Further, more or less of items 120, 122, and 135 are present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric may be utilized for any System on Chip (SoC or SOC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect Express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 412 of FIG. 4). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Generally, processing/caching agents send requests to a home node for access to a memory address with which a corresponding "home agent" is associated. Also, in one embodiment, MEM0 through MEM3 can be configured to mirror data, e.g., as master and slave. Also, one or more components of system 200 can be included on the same integrated circuit die in some embodiments.

Furthermore, one implementation (such as shown in FIG. 2) is for a socket glueless configuration with mirroring. For example, data assigned to a memory controller (such as MC0/HA0) is mirrored to another memory controller (such as MC3/HA3) over the PtP links.

Figure 3:
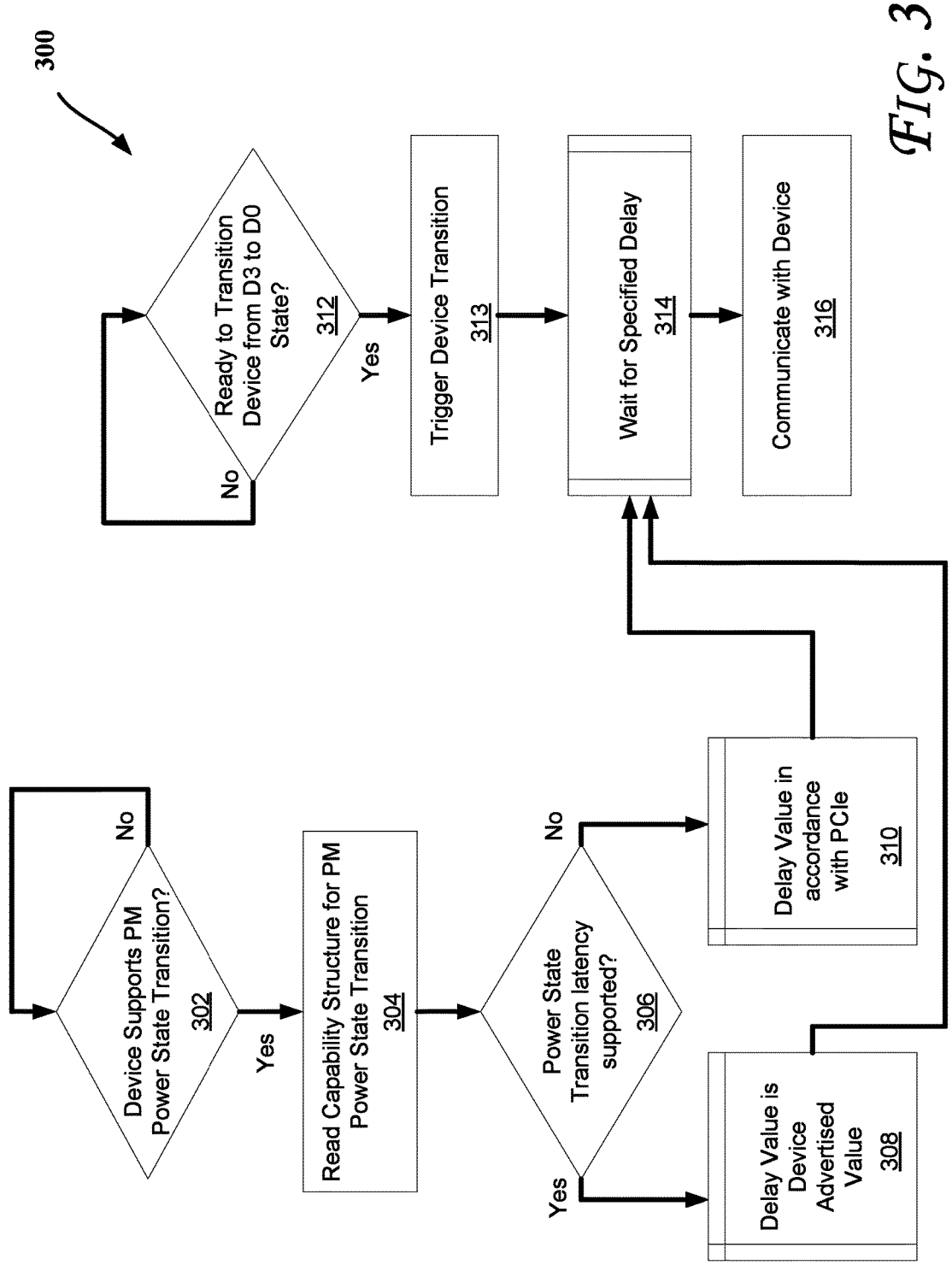
FIG. 3 illustrates a flow diagram according to an embodiment.

FIG. 3 illustrates a flow diagram of a method 300 for device power management state transition latency advertisement for faster boot time, according to some embodiments. In an embodiment, various components discussed with reference to FIGS. 1-2 and 4-5 may be utilized to perform one or more of the operations discussed with reference to FIG. 3.

Referring to FIGS. 1-3, at an operation 302, it is determined (e.g., by a logic such as the PCIe controller logic 135 or a processor core) whether a device (such as one of the I/O devices 124) supports Power Management (PM) state transition (e.g., between states D0 and D3 hot/cold). This is done via a device enumeration process in an embodiment. If the device supports PM power state transition, the corresponding capability structure is read (e.g., by a logic such as the PCIe controller logic 135 or a processor core) at an operation 304 so that the PM power state transitions may be performed in accordance with the information stored in the capability structure (which may be stored in a storage device, memory, register field, register, etc.).

At an operation 306, it is determined (e.g., by a logic such as the PCIe controller logic 135 or a processor core) whether the device supports power state transition latency support. PCI devices generally know what their specific transition delay from D3 to D0 is and may advertise the transition delay via a storage unit such as disclosed herein. If the device supports power state transition, the delay value used during D3 hot/cold transition to D0 is determined based on device advertised delay value at an operation 308. Otherwise, the delay value in accordance with the PCIe standard is used at an operation 310. In various embodiments, various storage units may be used to store the PCIe capability structure where the device would advertise the recovery time it takes for transition from D3 hot and/or D3 cold power states to D0. The various storage units may include one or more of a storage device, memory, a register, a register field, a packet, a packet field, combinations thereof, etc., including any item capable of storing or communicating data such as any of those discussed herein.

At an operation 312, it is determined whether logic/software (such as firmware, PCIe bus driver, OS (Operating System), device driver, combinations thereof, or any other power management software responsible for bringing up the device states) is ready to cause the device to transition from D3 hot/cold to D0. If so, the device is triggered to transition from its low power consumption state (e.g., D3 hot/cold) to a normal/operating power consumption state (e.g., D0) at an operation 313. In an embodiment, operation 313 is performed via a configuration write to the device.

Once the device is triggered to transition, at an operation 314, the specified delay value (e.g., from operations 308 or 310) is read by the software/logic of operation 312 and any access to the device is delayed for the specified delay value. For those devices that do not advertise this capability, the same software/logic would assume the specification defined default value of 10 ms or 100 ms (depending on whether the device is existing from D3 hot or D3 cold, respectively). After the wait of operation 314, the device may be accessed at operation 316.

In various embodiments, one or more of the operations 302-310 may be performed prior to operation 312 or substantially simultaneously with operation 312, but in either case the value of the transition delay needs to be known prior to conclusion of operation 312 to ensure an accurate wait time for operation 314. For example, operations 302-310 or only operations 302-304 may be performed upon device boot; and, if only operations 302-304 are performed upon device boot, operations 306-310 may be performed prior to or substantially simultaneously with operation 312 such that the transition delay value is known prior to termination/conclusion of operation 312.

Moreover, since some devices are aware of their PCI PM state latencies and capable of advertising the latency delay, the resulting shorter resume time(s) used in accordance with some embodiments for such devices provide for a rich user experience.

In some embodiments, various techniques may be used to communicate the known power management state transition latency delay from a device to other logic or software (such as firmware, PCIe bus driver, OS or any other power management software responsible for bringing up the device states). For example, some embodiments may utilize ACPI (Advanced Configuration and Power Interface) to communicate the transition latency delay values. Generally, in computing systems, the ACPI specification provides an open standard for device configuration and power management by the OS. In some embodiments, at least some of the power consumption states and/or techniques discussed herein may be in accordance with or similar to those defined under ACPI specification, Revision 3.0, September 2004. In an embodiment, ACPI may be used to determine and/or communicate the transition latency delay values for D3 hot/cold to D0 transition at boot time (e.g., first boot of a device).

Figure 4:
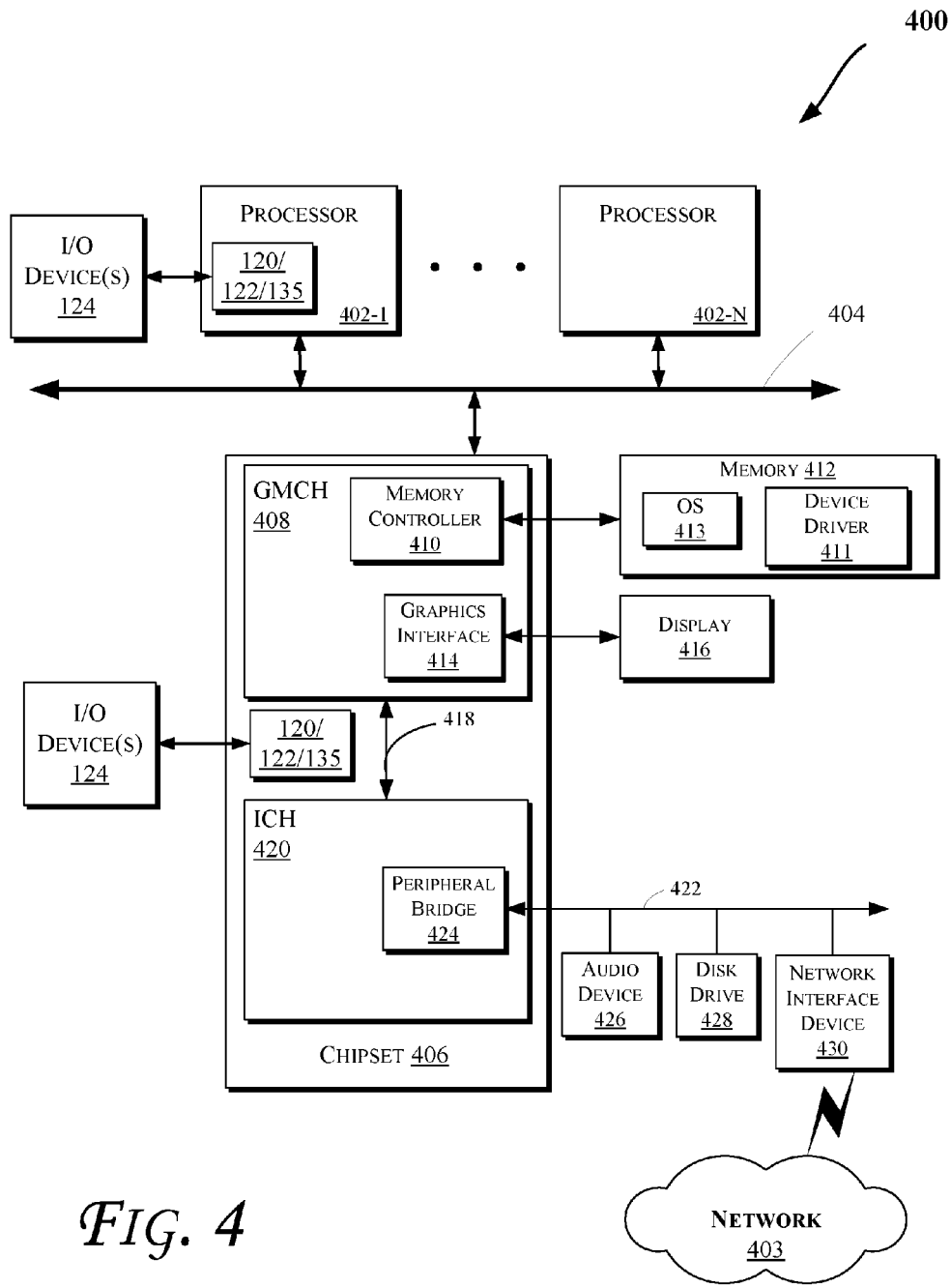
FIG. 4 illustrates a block diagram of an embodiment of a computing system, which can be utilized to implement one or more embodiments discussed herein.

FIG. 4 illustrates a block diagram of a computing system 400 in accordance with an embodiment of the invention. The computing system 400 may include one or more central processing unit(s) (CPUs) 402-1 through 402-N or processors (collectively referred to herein as "processors 402" or more generally "processor 402") that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

Also, the operations discussed with reference to FIGS. 1-3 may be performed by one or more components of the system 400. In some embodiments, the processors 402 may be the same or similar to the processors 202-208 of FIG. 2. Furthermore, the processors 402 (or other components of the system 400) may include one or more of the IOH 120, RC 122, and the PCIe Controller 135. Moreover, even though FIG. 4 illustrates some locations for items 120/122/135, these components may be located elsewhere in system 400. For example, I/O device(s) 124 may communicate via bus 422, etc.

A chipset 406 may also communicate with the interconnection network 404. The chipset 406 may include a graphics and memory controller hub (GMCH) 408. The GMCH 408 may include a memory controller 410 that communicates with a memory 412. The memory 412 may store data, including sequences of instructions that are executed by the CPU 402, or any other device included in the computing system 400. For example, the memory 412 may store data corresponding to an operation system (OS) 413 and/or a device driver 411 as discussed with reference to the previous figures. In an embodiment, the memory 412 and memory 140 of FIG. 1 may be the same or similar. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

Additionally, one or more of the processors 402 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 400. For example, the cache may locally cache data stored in a memory 412 for faster access by the components of the processors 402. In an embodiment, the cache (that may be shared) may include a mid-level cache and/or a last level cache (LLC). Also, each processor 402 may include a level 1 (L1) cache. Various components of the processors 402 may communicate with the cache directly, through a bus or interconnection network, and/or a memory controller or hub.

The GMCH 408 may also include a graphics interface 414 that communicates with a display device 416, e.g., via a graphics accelerator. In one embodiment of the invention, the graphics interface 414 may communicate with the graphics accelerator via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments of the invention. In addition, the processor 402 and one or more components of the GMCH 408 and/or chipset 406 may be combined to form a single integrated circuit chip (or be otherwise present on the same integrated circuit die).

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
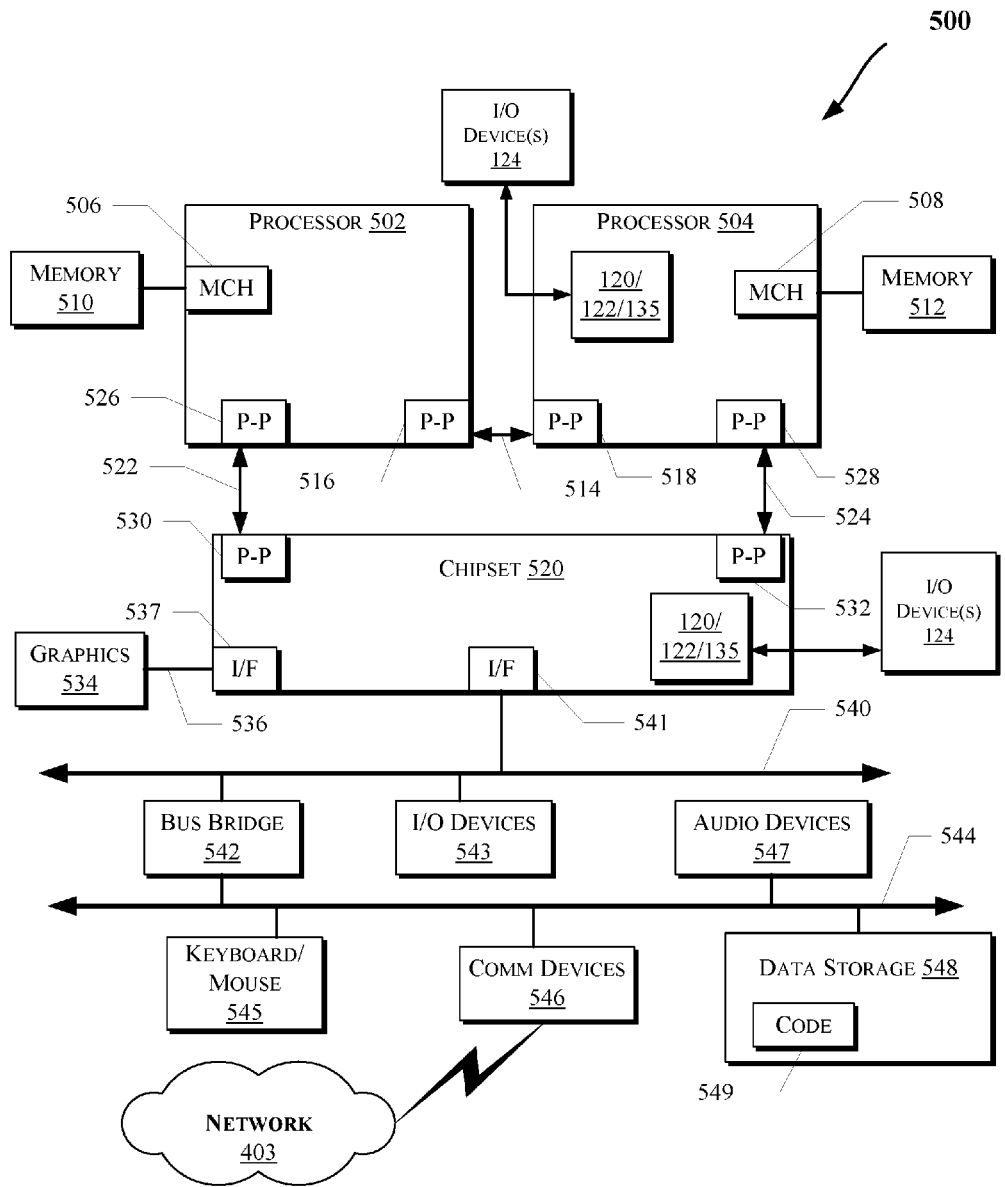
FIG. 5 illustrates a block diagram of an embodiment of a computing system, which can be utilized to implement one or more embodiments discussed herein.

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. As shown in FIG. 5, the processors 502 and 504 may also include the cache(s) discussed with reference to FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

At least one embodiment of the invention may be provided within the processors 502 and 504 or chipset 520. For example, the processors 502 and 504 and/or chipset 520 may include one or more of the IOH 120, RC 122, and the PCIe Controller 135. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5. Hence, location of items 120/122/135 shown in FIG. 5 is exemplary and these components may or may not be provided in the illustrated locations.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

The following examples pertain to further embodiments. Example 1 includes an apparatus comprising: a wait agent coupled to a storage unit to store a value to correspond to a requisite transition delay period for an exit agent to exit from a low power consumption state, wherein the wait agent is to wait for the requisite transition delay period, in response to the wait agent determining that the exit agent has initiated its exit from the low power consumption state, before the wait agent attempts to communicate with the exit agent via a link. In example 2, the subject matter of example 1 can optionally include an apparatus, wherein the exit agent is to write the value to the storage unit at boot time. In example 3, the subject matter of example 1 can optionally include an apparatus, wherein the exit agent is to write the value to the storage unit via ACPI (Advanced Configuration and Power Interface). In example 4, the subject matter of example 1 can optionally include an apparatus, wherein the exit agent is to comprise an input/output device In example 5, the subject matter of example 1 can optionally include an apparatus, wherein the low power consumption state is to comprise one of a D3 hot power state and a D3 cold power state. In example 6, the subject matter of example 5 can optionally include an apparatus, wherein the value is about 10 ms for the D3 hot state in accordance with a PCIe standard and wherein the value is about 100 ms for the D3 cold state in accordance with a PCIe standard. In example 7, the subject matter of example 1 can optionally include an apparatus, wherein the exit agent is to communicate with the wait agent in response to a request from one or more of: logic, software, firmware, PCIe bus driver, Operating System (OS), device driver and combinations thereof. In example 8, the subject matter of example 1 can optionally include an apparatus, wherein the storage unit is to comprise one or more of: a storage device, memory, a register, a register field, a packet, a packet field, and combinations thereof. In example 9, the subject matter of example 1 can optionally include an apparatus, wherein one or more of the wait agent, the exit agent, and the storage unit are on a same integrated circuit chip.

Example 10 includes an apparatus comprising: an exit agent to transmit a value to correspond to a requisite transition delay period for the exit agent to exit from a low power consumption state, wherein a link, to be associated with the exit agent, is to be silent for the requisite transition delay period in response to the exit agent writing the value to the storage unit and initiating an exit from the low power consumption state. In example 11, the subject matter of example 10 can optionally include an apparatus, wherein the exit agent is to write the value to the storage unit at boot time. In example 12, the subject matter of example 10 can optionally include an apparatus, wherein the exit agent is to write the value to the storage unit via ACPI (Advanced Configuration and Power Interface). In example 13, the subject matter of example 10 can optionally include an apparatus, wherein the exit agent is to comprise an input/output device. In example 14, the subject matter of example 10 can optionally include an apparatus, wherein the low power consumption state is to comprise one of a D3 hot power state and a D3 cold power state. In example 15, the subject matter of example 14 can optionally include an apparatus, wherein the value is about 10 ms for the D3 hot state in accordance with a PCIe standard and wherein the value is about 100 ms for the D3 cold state in accordance with a PCIe standard. In example 16, the subject matter of example 10 can optionally include an apparatus, wherein the exit agent is to communicate with the wait agent in response to a request from one or more of: logic, software, firmware, PCIe bus driver, Operating System (OS), device driver and combinations thereof. In example 17, the subject matter of example 10 can optionally include an apparatus, wherein the storage unit is to comprise one or more of: a storage device, memory, a register, a register field, a packet, a packet field, and combinations thereof. In example 18, the subject matter of example 10 can optionally include an apparatus, wherein one or more of the wait agent, the exit agent, and the storage unit are on a same integrated circuit chip. In example 19, the subject matter of example 10 can optionally include an apparatus of any one of examples 1 to 18, wherein the link is to comprise a point-to-point coherent interconnect.

Example 20 includes system comprising: a processor coupled to a storage unit; and the storage unit to store a value corresponding to a requisite transition delay period for a first agent to exit from a low power consumption state, wherein the first agent is to write the value to the storage unit and wherein a second agent is to wait for the requisite transition delay period, after the first agent initiates its exit from the low power consumption state, before the second agent attempts to communicate with the first agent via a link, and wherein one or more of the first agent, the second agent, and the storage unit are on a same integrated circuit chip. In example 21, the subject matter of example 20 can optionally include a system, wherein the first agent is to write the value to the storage unit at boot time. In example 22, the subject matter of example 20 can optionally include a system, wherein the first agent is to write the value to the storage unit via ACPI (Advanced Configuration and Power Interface).

Example 23 includes a method comprising: storing a value corresponding to a requisite transition delay period for a first agent to exit from a low power consumption state in a storage unit, wherein the first agent writes the value to the storage unit and wherein a second agent waits for the requisite transition delay period, after the first agent initiates its exit from the low power consumption state, before the second agent attempts to communicate with the first agent via a link. In example 24, the subject matter of example 23 can optionally include a method, further comprising the first agent writing the value to the storage unit at boot time. In example 25, the subject matter of example 23 can optionally include a method, further comprising the first agent writing the value to the storage unit via ACPI (Advanced Configuration and Power Interface). In example 26, the subject matter of example 23 can optionally include a method, wherein the value is different than a transition delay period in accordance with a PCIe standard. In example 27, the subject matter of example 23 can optionally include a method, further comprising the second agent communicating with the first agent in response to a request from one or more of: logic, software, firmware, PCIe bus driver, Operating System (OS), device driver and combinations thereof. In example 28, the subject matter of example 23 can optionally include a method, wherein the link is to comprise a point-to-point coherent interconnect. Example 29 includes a computer-readable medium comprising one or more instructions that when executed on a processor configure the processor to perform one or more operations of any of examples 23 to 28.

Example 30 includes a system comprising: a processor coupled to a storage unit; and the storage unit to store a value corresponding to a requisite transition delay period for a first agent to exit from a low power consumption state, wherein the first agent is to write the value to the storage unit and wherein a second agent is to wait for the requisite transition delay period, after the first agent initiates its exit from the low power consumption state, before the second agent attempts to communicate with the first agent via a link. In example 31, the subject matter of example 30 can optionally include a system, wherein the first agent is to write the value to the storage unit at boot time. In example 32, the subject matter of example 30 can optionally include a system, wherein the first agent is to write the value to the storage unit via ACPI (Advanced Configuration and Power Interface). In example 33, the subject matter of example 30 can optionally include a system, wherein the first agent is to comprise an input/output device. In example 34, the subject matter of example 30 can optionally include a system, wherein the link comprises a Peripheral Component Interconnect Express (PCIe) link. In example 34, the subject matter of example 30 can optionally include a system, wherein the low power consumption state is to comprise one of a D3 hot power state and a D3 cold power state. In example 36, the subject matter of example 35 can optionally include a system, wherein the value is about 10 ms for the D3 hot state in accordance with a PCIe standard. In example 37, the subject matter of example 35 can optionally include a system, wherein the value is about 100 ms for the D3 cold state in accordance with a PCIe standard. In example 38, the subject matter of example 30 can optionally include a system, wherein the value is different than a transition delay period in accordance with a PCIe standard. In example 39, the subject matter of example 30 can optionally include a system, wherein the second agent is to communicate with the first agent in response to a request from one or more of: logic, software, firmware, PCIe bus driver, Operating System (OS), device driver and combinations thereof. In example 40, the subject matter of example 30 can optionally include a system, wherein the storage unit is to comprise one or more of: a storage device, memory, a register, a register field, a packet, a packet field, and combinations thereof. In example 41, the subject matter of example 30 can optionally include a system, wherein the link is to comprise a point-to-point coherent interconnect. In example 42, the subject matter of example 30 can optionally include a system, wherein one or more of the first agent, the second agent, and the storage unit are on a same integrated circuit chip. In example 43, the subject matter of example 30 can optionally include a system, wherein the first agent is to comprise the processor. In example 44, the subject matter of example 30 can optionally include a system, wherein the processor is to comprise one or more processor cores.

Example 45 includes an apparatus comprising: means for storing a value corresponding to a requisite transition delay period for a first agent to exit from a low power consumption state in a storage unit, wherein the first agent writes the value to the storage unit and wherein a second agent waits for the requisite transition delay period, after the first agent initiates its exit from the low power consumption state, before the second agent attempts to communicate with the first agent via a link. In example 46, the subject matter of example 45 can optionally include an apparatus, further comprising means for the first agent writing the value to the storage unit at boot time. In example 47, the subject matter of example 45 can optionally include an apparatus, further comprising means for the first agent writing the value to the storage unit via ACPI (Advanced Configuration and Power Interface). In example 48, the subject matter of example 45 can optionally include an apparatus, wherein the value is different than a transition delay period in accordance with a PCIe standard. In example 49, the subject matter of example 45 can optionally include an apparatus, further comprising means for the second agent communicating with the first agent in response to a request from one or more of: logic, software, firmware, PCIe bus driver, Operating System (OS), device driver and combinations thereof. In example 50, the subject matter of example 45 can optionally include an apparatus, wherein the link is to comprise a point-to-point coherent interconnect. In example 51, the subject matter of any one of examples 1 to 19 and 45 to 50 can optionally include an apparatus, wherein the value is different than a transition delay period in accordance with a PCIe standard.

In example 52, the subject matter of any one of examples 1 to 19 and 45 to 50 can optionally include an apparatus, wherein the link comprises a Peripheral Component Interconnect Express (PCIe) link.

In example 53, the subject matter of any one of examples 23 to 28 and 45 to 50 can optionally include a method, wherein the low power consumption state comprises one of a D3 hot power state and a D3 cold power state.

In example 54, the subject matter of any one of examples 30 to 44 can optionally include a system, wherein the value is different than a transition delay period in accordance with a PCIe standard.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a tangible (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A apparatus comprising:
a serial point-to-point link interface to enable communication between a processor and a device;
wherein the serial point-to-point link interface implements a protocol stack and includes a transmitter to transmit serial data to the device and a receiver to deserialize a serial stream from the device;
wherein the protocol stack is to support a plurality of power management states, including an active state, a first off state, in which power rails are on, and a second off state, in which the power rails are off;
wherein the protocol stack is configured to provide a default wait time to allow the device to begin a transition from the second off state to the active state prior to access of the device; and
wherein the protocol stack is configured to access the device prior to expiration of the default wait time to complete the transition based on a device-advertised wait time, wherein the device-advertised wait time is to be provided by the device.

2. The apparatus of claim 1, wherein the apparatus is a system on a chip.

3. The apparatus of claim 1, wherein the protocol stack is a peripheral component interconnect express (PCIe) protocol stack and the device is a PCIe endpoint device.

4. The apparatus of claim 1, wherein the protocol stack is to access the device-advertised wait time via a register.

5. The apparatus of claim 1, wherein the first off state is a D3_hot state and the second off state is a D3_cold state.

6. A apparatus comprising:
a multicore processor;
a level-2 (L2) cache controller coupled to the multicore processor;
an L2 cache coupled to the L2 cache controller and the multicore processor;
an integrated memory controller; and
a serial point-to-point link interface to enable communication between the multicore processor and a device;
wherein the serial point-to-point link interface implements a protocol stack and includes a transmitter to transmit serial data to the device and a receiver to deserialize a serial stream from the device;
wherein the protocol stack is to support a plurality of power management states, including an active state, a first off state, in which power rails are on, and a second off state, in which the power rails are off;
wherein the protocol stack is configured to provide a default wait time to allow the device to begin a transition from the second off state to the active state prior to access of the device; and
wherein the protocol stack is configured to access the device prior to expiration of the default wait time to complete the transition based on a device-advertised wait time, wherein the device-advertised wait time is to be provided by the device.

7. The apparatus of claim 6, wherein the apparatus is a system on a chip.

8. The apparatus of claim 6, wherein the protocol stack is a peripheral component interconnect express (PCIe) protocol stack and the device is a PCIe endpoint device.

9. The apparatus of claim 6, wherein the protocol stack is to access the device-advertised wait time via a register.

10. The apparatus of claim 6, wherein the first off state is a D3_hot state and the second off state is a D3_cold state.

* * * * *